(12) United States Patent
Koning et al.

(10) Patent No.: US 6,548,591 B2
(45) Date of Patent: Apr. 15, 2003

(54) HIGH-MOLECULAR POLYAMIDE COMPOSITION WITH IMPROVED FLOW BEHAVIOR

(75) Inventors: Cornelis E. Koning, Brunssum (NL); Gerardus J. M. De Koning, Spaubeek (NL); Jeroen J. Crevecoeur, Maastricht (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/998,930

(22) Filed: Dec. 3, 2001

(65) Prior Publication Data

US 2002/0103287 A1 Aug. 1, 2002

Related U.S. Application Data

(63) Continuation of application No. PCT/NL00/00339, filed on May 19, 2000.

(30) Foreign Application Priority Data

Jun. 4, 1999 (NL) .............................................. 1012234

(51) Int. Cl.[7] .......................... C08K 3/40; C08F 283/04
(52) U.S. Cl. ........................ 524/494; 525/420; 525/432
(58) Field of Search .......................... 524/494; 525/420, 525/432

(56) References Cited

U.S. PATENT DOCUMENTS 5,414,051 A    5/1995   Mason et al.

FOREIGN PATENT DOCUMENTS

| EP | 0292677 | 11/1988 |
|----|---------|---------|
| EP | 0444295 | 9/1991 |
| JP | 5214246 | 8/1993 |
| WO | 9514059 | 5/1995 |

Primary Examiner—Kriellion A. Sanders
(74) Attorney, Agent, or Firm—Pillsbury Winthrop LLP

(57) ABSTRACT

The invention relates to a polyamide composition with improved flow behavior that comprises at least 80–99.5 wt. % of a high-molecular polyamide and 0.5–20 wt. % of a polyamide oligomer that has a melting point that is higher than the melting point of the high-molecular polyamide, the amounts being relative to the total weight of the polyamide present in the composition. The high-molecular polyamide is preferably PA-6 or PA-4,6/6 copolymer and the polyamide oligomer is preferably chosen from the group comprising PA-6,6, PA-4,6, PA-4,6/6 copolyamide or copolyamides or mixtures thereof.

The invention also relates to a process for improving the flow behavior of a high-molecular polyamide composition by melt-mixing a high-molecular polyamide and a polyamide oligomer having a melting point that is higher than the melting point of the high-molecular polyamide at a melt temperature that is equal to or lower than the melting point of the polyamide oligomer and also a high-molecular polyamide composition obtainable with this process.

11 Claims, 1 Drawing Sheet

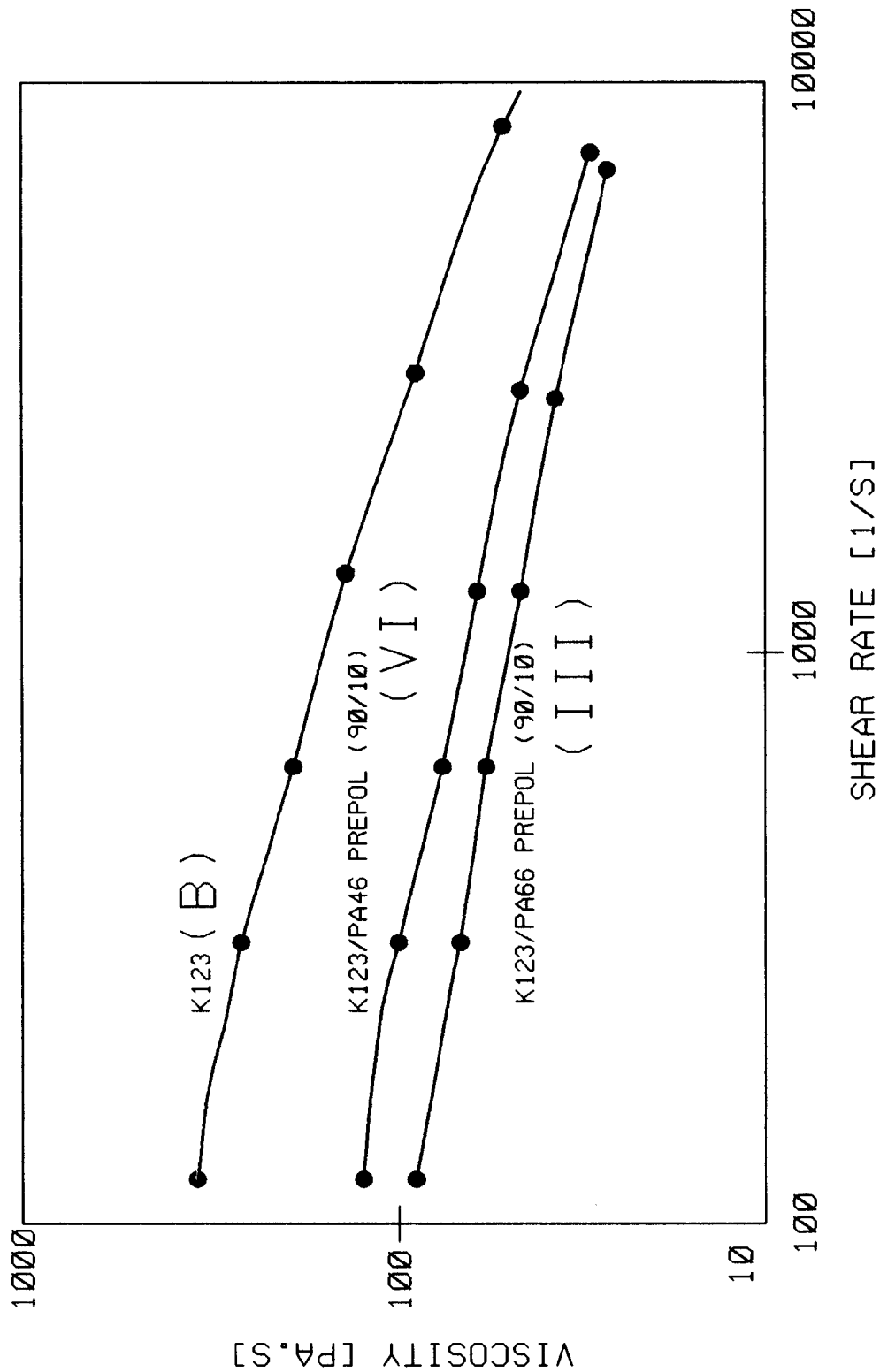

HIGH-MOLECULAR POLYAMIDE COMPOSITION WITH IMPROVED FLOW BEHAVIOR

CROSS-REFERENCE TO RELATED APPLICATIONS

This is a Continuation of International Application No. PCT/NL00/00339 filed May 19, 2000 which designated the U.S. and was published in the English language. The contents of this PCT application are incorporated in their entirely by reference.

The invention relates to a polyamide composition with improved flow behaviour that comprises at least 80–99.5 wt. % high-molecular polyamide and 0.5–20 wt. % low-molecular polyamide, the amounts being relative to the total weight of the polyamide present in the composition.

Such a composition is known from JP-A-5214246 (Toray, 1992), which describes a composition that comprises 100 parts by weight polyamide-6 and 0.001–10 parts by weight of a polyamide oligomer based on stearic acid, methylenediamine and sebacic acid, having a $M_w$ of at most 5,000 and comprising modified end groups.

Said composition presents the drawback that the mechanical properties are not, or to an insufficient extent, retained after the addition of the polyamide oligomer according to JP-A-5214246. Another drawback is that modifying the polyamide end groups is a laborious procedure and implies an additional process step in the preparation of the oligomer. Another drawback is that the polyamide oligomer is not commercially available, as a result of which the invention has had no commercial or large-scale implementation up to now.

Obtaining a high-molecular polyamide composition with good flow behaviour and with the typical polyamide properties being retained is of great importance for the purpose of obtaining films, fibres or moulded parts, in particular thin-walled moulded parts, that are obtained with the aid of the injection-moulding process. High-molecular polyamides generally have a high melt viscosity and poor flow behaviour. High-molecular polyamides do however have very good mechanical properties, in particular a high impact resistance, stiffness, deformation resistance and dimensional stability on heating, elongation at break and modulus of elasticity. For the purpose of improving the mechanical properties even further, in particular the stiffness or impact resistance the polyamide is often mixed with inorganic fillers such as glass fibres or impact modifiers. However, this leads to even further deterioration of the flow behaviour, so that it becomes difficult to injection-mould large or thin-walled moulded parts that also have an optically perfect surface, using for example glass-fibre-filled polyamide compositions.

An improvement in the flow behaviour is generally obtained by adding flow-promoting agents. Examples of flow-promoting agents mentioned in the literature are branched fluid crystalline oligoesters or oligoesteramides (EP-A-444295), low-molecular polyester (DE-A-4127720), polyolefinic waxes, modified with polar side chains (BE-A-820472) or salts of magnesium, zinc and aluminium (WO 97/19131).

The inventors have now surprisingly found that the drawbacks of the state of the art can be avoided and a high-molecular polyamide composition with good flow behaviour and with good mechanical properties can be obtained if this composition contains at least 0.5–20 wt. % low-molecular polyamide (a polyamide oligomer) having a melting point that is higher than the melting point of the high-molecular polyamide, the amount being relative to the polyamide's total weight. The high-molecular polyamide has a different chemical composition than the polyamide oligomer in the composition according to the invention.

From WO 98/24836 is known a process for the production of a polyamide moulded part with improved crystallisation behaviour from a polyamide composition containing 0.01–5 wt. % polyamide-4,6 and 99.99–95 wt. % of a polyamide having a melting point that is lower than that of polyamide-4,6. A composition containing a low-molecular polyamide 4,6 is not described, neither is the advantage of any associated improved flow behaviour acknowledged.

Suitable polyamides, both with a high-molecular weight and with a low-molecular weight (oligomers), are all the polyamides known to a person skilled in the art, comprising crystalline, semi-crystalline and amorphous polyamides. Examples of suitable polyamides according to the invention are aliphatic polyamides, for example PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide, PA-4,6/6-copolyamide, PA-6/6,6/6,10-terpolyamide, and copolyamides obtained from 1,4-cyclohexanedicarboxylic acid and 2,2,4- and 2,4,4-trimethylhexamethylenediamine, aromatic polyamides, for example PA-6,I, PA-6,I/6,6-copolyamide, PA-6,T/6-copolyamide, PA-6,T/6-copolyamide, PA-6,I/6,T-copolyamide, copolyamides obtained from terephthalic acid, 2,2,4- and 2,4,4-trimethylhexamethylenediamine, copolyamide obtained from isophthalic acid, laurinlactam and 3,5-dimethyl-4,4-diamino-dicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexylmethane, copolyamides obtained from caprolactam, isophthalic acid and/or terephthalic acid and isophoronodiamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, or copolyamides or mixtures of the aforementioned polyamides.

Preferably polyamides are chosen from the group comprising PA-6, PA-6,6, PA-6,10, PA-4,6, PA-11, PA-12, PA-12,12, PA-6,I, PA-6,T/6,6-copolyamide, PA-6,T/6-copolyamide, PA-6/6,6-copolyamide, PA-4,6/6-copolyamide or mixtures or copolyamides of the aforementioned polyamides. More preferably PA-6, PA-6,6 or PA-4,6 is chosen, or mixtures or copolyamides thereof.

The polyamides in the composition according to the invention may optionally contain modified end groups, for example amine end groups modified with carboxylic acid.

The high-molecular polyamide has a weight-average molecular weight of at least 10,000 g/mol, preferably at least 15,000 g/mol, more preferably at least 20,000 g/mol.

The low-molecular polyamide has a weight-average molecular weight that is preferably lower than the "molecular weight between entanglements" of the high-molecular polymer. This "molecular weight between entanglements" is for example 5,000 g/mol in the case of PA-6. Preferably the weight average molecular weight is at most 5,000 g/mol, preferably at most 4,000 g/mol, more preferably at most 3,000 g/mol. The molecular weight may not be too low either, to avoid the risk of for example the glass transition temperature being lowered. Preferably the weight-average molecular weight is greater than approximately 1,000 g/mol.

Preferably, the composition comprises a high-molecular weight polyamide with a molecular weight of at least 10,000 g/mol and a low-molecular oligomer with a molecular weight of at most 5,000 g/mol.

More preferably, the composition comprises a high-molecular weight polyamide with a molecular weight of at least 15,000 g/mol and a low-molecular oligomer with a molecular weight of at most 4,000 g/mol.

The composition according to the invention comprises 0.5–20 wt. % oligomer, relative to the total amount of polyamide. The amount of oligomer can be chosen by a person skilled in the art within the given range, depending on the desired properties of the composition. Larger amounts of the oligomer result in a better flow behaviour, but too large amounts adversely affect the mechanical properties. Preferably an amount of 1–10 wt. % is chosen, relative to the total amount of polyamide.

The composition according to the invention preferably comprises a high-molecular polyamide, chosen from the group comprising PA-6, PA-6,6, PA-6,10, PA-4,6, PA-11, PA-12, PA-12,12, PA-6,I, PA-6,T/6,6-copolyamide, PA-6,T/6-copolyamide, PA-6/6,6-copolyamide, PA-4,6/6-copolyamide or copolyamides or mixtures thereof and a polyamide oligomer chosen from the group comprising PA-6,6, PA-4,6, PA-4,6/6-copolymer or copolyamides or mixtures thereof.

In the context of this application "PA-4,6" is understood to be a polyamide of which at least 50%, preferably at least 75%, more preferably at least 90%, consists of tetramethyleneadipamide units. PA-4,6 can be prepared through polycondensation of tetramethylenediamine and adipic acid or an adduct thereof, optionally in the presence of other polyamide-forming monomers, for example ε-caprolactam, a different diamine, for example hexamethylenediamine or a different carboxylic acid, for example isophthalic acid or cyclohexanedicarboxylic acid. Polyamide-4,6 and the preparation thereof are described in for example the Encyclopedia of Polymer Science and Engineering, Vol. 11, pp.315 ff (1988). The preparation process of PA-4,6 presents the advantage that it consists of at least two steps, in which an oligomer having a $M_w$=1,000–5,000 g/mol can easily be obtained. This oligomer can subsequently be after-condensed to obtain a high-molecular polyamide. PA-4,6 is commercially available under the trade name STANYL® and is produced by DSM N.V., the Netherlands.

The composition according to the invention may also contain the usual additives, for example flame retardants, fillers, release agents, lubricants and pigments. Preferably, the composition contains glass fibres. The low viscosity of the composition according to the invention can facilitate the dispersion of these fillers as a result of the improved wetting.

The composition can be prepared in any way known to a person skilled in the art, for example by melt-mixing powder mixtures or granule mixtures, for example with the aid of an extruder. In a preferred embodiment, the oligomer can be added to the melt of the high-molecular polyamide by means of a side-feeder mounted to the extruder.

It was surprisingly also found that the flow behaviour of the composition according to the invention can be further improved by melt-mixing the polyamide components at a melt temperature that is equal to or lower than the melting point of the polyamide oligomer. This process offers the advantage that the composition according to the invention can be used at the usual processing temperatures of high-molecular polyamides. The invention therefore also relates to a process for improving the flow behaviour of a high-molecular polyamide composition by melt-mixing a high-molecular polyamide and a polyamide oligomer having a melting point that is higher than the melting point of the high-molecular polyamide, at a melt temperature that is equal to or lower than the melting point of the polyamide oligomer (but of course equal to or higher than the melting temperature of the lowest melting polyamide in the composition, and a high-molecular polyamide composition obtained using the process according to the invention. The definitions of high-molecular weight polyamides and low-molecular weight polyamides (oligomers) are the same as mentioned above for the composition according to our invention.

The invention will now be elucidated with reference to a few examples, and accompanying drawing, but is not limited thereto.

BRIEF DESCRIPTION OF DRAWINGS

The attached FIGURE is a graphical representation of the results (melt viscosity (Pa.s) versus shear rate (1/s)) obtained in Example III, Example VI and Comparative Example A.
High-Molecular Weight PA
Polyamide-6, $T_{melt}$=225° C., $M_w$=18,500, $\eta_{rel}$ (formic acid)=2.0, Akulon® K120 from DSM N.V., the Netherlands
Polyamide-6, $T_{melt}$=223° C., $M_w$=25,500, $\eta_{rel}$ (formic acid)=2.3, Akulon® K123 from DSM N.V., the Netherlands
Polyamide-6,6, $T_{melt}$=265° C., $M_w$=23,000, $\eta_{rel}$ (formic acid)=2.2, Akulon® S222 from DSM N.V., the Netherlands
Glass fibre: length=6 mm, diameter 1–14 µm
Oligomer PA-6,6, $M_w$=1,500, $T_{melt}$=260° C.
Oligomer PA-4,6, $M_w$=2,000, $T_{melt}$=288° C.
Determination of the Physical Properties
Modulus: determined at 23° C. and 5 mm/min, according to ISO 527
Tensile strength: determined at 23° C. and 5 mm/min, according to ISO 527
Elongation at break: determined at 23° C. and 5 mm/min, according to ISO 527
Flow behaviour: spiral flow length, determined by means of injection-moulding at 280° C. and at an injection-moulding pressure of $40.10^5$ Pa.
Charpy N (notched) determined at 23° C. according to ISO 179/1eA
Charpy UN (unnotched) determined at 23° C. according to ISO 179/1eU
Surface: visual inspection of the surface of injection-moulded plates
Molecular weight: determined with the aid of standard GPC techniques
Melting point: determined with the aid of DSC (2nd run, 10° C./min.)

Examples I–VI and Comparative Examples A and B

A number of oligomers were mixed with high-molecular polyamide in a ZSK-30 twin-screw extruder using a flat temperature profile of 250° C. for PA-6 and 280° C. for PA-66, at a screw speed of 200 rpm and at a throughput of approximately 10 kg/hour. All the compositions contained 30 wt. % glass fibres, added via a side feed. The polymer melt was degassed at the end of the extruder.

The results, presented in Table 1, show that the addition of an oligomer to a high-molecular polyamide leads to the formation of a high-molecular polyamide composition with good mechanical properties and improved flow behaviour. Surprisingly, even better flow behaviour could be obtained than the flow behaviour of the composition containing a polyamide having the lower molecular weight (compare Comparative Example A and for instance Example II). Surprisingly, melt-mixing the composition according to the invention at a temperature that is equal to or lower than the melting point of the oligomer (and of course above the melting point of the high-molecular polyamide) led to a composition with even more improved flow behaviour (compare Examples II and III and Examples V and VI). Surprisingly it was also found that the surface of injection-moulded plates having the composition according to the invention greatly improved relative to the surface of injection-moulded plates according to Comparative Example B.

FIG. 1 shows the melt viscosity versus the shear rate in the event of capillary flow at 260° C. of the compositions of Comparative Example A, Example III and Example VI. This shows that the pseudo-plastic behaviour, represented by the gradient of the curve, is not affected by the presence of oligomers in the composition as the entire curve has shifted to a lower viscosity. It may thus be stated that the oligomeric polyamides act as flow-promoting agents in the entire area that is relevant for injection-moulding applications.

PA-6,6, PA-6,10, PA-4,6, PA-11, PA-12, PA-12,12, PA-6,I, PA-6,T/6,6-copolyamide, PA-6,T/6-copolyamide, PA-6/6,6-copolyamide, PA-4,6/6-copolyamide or copolyamides or mixtures thereof.

5. Polyamide composition according to claim 4, wherein the polyamides are chosen from the group comprising PA-6, PA-6,6, PA-4,6, PA-4,6/6 copolyamide or copolyamides or mixtures thereof.

6. Polyamide composition according to claim 1, wherein the amount of low-molecular polyamide is 1–10 wt. %, relative to the total amount of polyamide.

7. Polyamide composition according to claim 1, wherein the high-molecular polyamide is chosen from the group comprising PA-6, PA-6,6, PA-6,10, PA-4,6, PA-11, PA-12, PA-12,12, PA-6,I, PA-6,T/6,6-copolyamide, PA-6,T/6-copolyamide, PA-6/6,6-copolyamide, PA-4,6/6 copolyamide or copolyamides or mixtures thereof and the polyamide oligomer chosen from the group comprising PA-6,6, PA-4,6, PA-4,6/6-copolyamide or copolyamides or mixtures thereof.

8. Polyamide composition according to claim 1, wherein the high-molecular polyamide is PA-6 or PA-4,6/6 copolymer and the polyamide oligomer is chosen from the group comprising PA-6,6, PA-4,6, PA-4,6/6 copolyamide or copolyamides or mixtures thereof.

TABLE 1

Properties of glass-fibre-filled (30 wt. %, relative to the composition's total weight) high-molecular PA-6 (K120 & K123) or PA-66 (S222) compositions containing different types of oligomers. The concentration of oligomers was calculated on the total amount of polyamide.

| | Unit | A | B | C | I | II | III | IV | V | VI | VI |
|---|---|---|---|---|---|---|---|---|---|---|---|
| High-molecular polyamide | | K120 | K123 | S222 | | | K123 | | | | S222 |
| Oligomer | | – | – | – | | PA-66 | | | PA-46 | | PA-46 |
| Conc. of oligomer | % | – | – | – | 5 | 10 | 10 | 5 | 10 | 10 | 4 |
| T-Compounding | C. | 250 | 250 | 280 | 265 | 265 | 250 | 280 | 280 | 250 | 280 |
| T-Melt | C. | 263 | 276 | 301 | 281 | 280 | 260 | 294 | 295 | 264 | 296 |
| Flow behaviour | mm | 606 | 406 | 347 | 580 | 674 | 841 | 488 | 640 | 788 | 449 |
| Modulus | GPa | 9.42 | 9.04 | 8.77 | 9.27 | 9.46 | 9.82 | 9.11 | 9.54 | 10.35 | 9.11 |
| Tensile strength | MPa | 181 | 168 | 166 | 181 | 183 | 176 | 180 | 183 | 183 | 169 |
| Elongation at break | % | 3.35 | 4.47 | 4.5 | 3.17 | 2.80 | 2.38 | 3.45 | 2.57 | 2.47 | 3.3 |
| Charpy N | kJ/m$^2$ | 11.6 | 13.4 | 8.7 | 11.0 | 11.0 | 10.7 | 11.2 | 11.0 | 10.5 | 7.8 |
| Charpy UN | kJ/m$^2$ | 65.8 | 93.9 | 69.9 | 30.5 | 58.5 | 52.0 | 50.9 | 56.6 | 46.3 | 51.3 |
| Surface | | + | – | – | + | + | + | + | + | + | + |

T-Compounding: the temperature set on the extruder.
T-Melt: the temperature measured in the melt.
Surface: +: good; –: poor.

What is claimed is:

1. Polyamide composition comprising at least 80–99.5 wt. % of a high-molecular polyamide having a weight-average molecular weight of at least 10,000 g/mol and 0.5–20 wt. % of a low molecular weight polyamide having a weight-average molecular weight of at most 5,000 g/mol and having a melting point that is higher than the melting point of the high-molecular polyamide, the amounts being relative to the total weight of the polyamide present in the composition.

2. Polyamide composition according to claim 1, wherein the average molecular weight of the low-molecular polyamide is at most 4,000 g/mol.

3. Polyamide composition according to claim 2, wherein the composition also contains glass fibres.

4. Polyamide composition according to claim 2, wherein the polyamides are chosen from the group comprising PA-6, 9. Process for improving the flow behaviour of a high-molecular polyamide composition by melt-mixing a high-molecular polyamide having a weight-average molecular weight of at least 10,000 g/mol and a low-molecular polyamide having a weight-average molecular weight of at most 5,000 g/mol and having a melting point that is higher than the melting point of the high-molecular polyamide at a melt temperature that is equal to or lower than the melting point of the low-molecular polyamide.

10. High-molecular polyamide composition obtained using the process according to claim 9.

11. Polyamide composition according to claim 2, wherein the weight-average molecular weight of the high-molecular polyamide is at least 15,000 g/mol.

* * * * *